United States Patent [19]

Mikus et al.

[11] Patent Number: 4,808,476

[45] Date of Patent: Feb. 28, 1989

[54] METHOD FOR PROTECTING HEAT SENSITIVE SUBSTRATES FROM FIRE AND EXCESSIVE HEAT AND RESULTING ARTICLE

[75] Inventors: John P. Mikus, Springdale; Robert W. Heber, Bethel Park; Thomas A. Ward, Gibsonia; Jerome A. Seiner, Pittsburgh, all of Pa.

[73] Assignee: PPG Industries, Inc., Pittsburgh, Pa.

[21] Appl. No.: 63,935

[22] Filed: Jun. 19, 1987

[51] Int. Cl.$^4$ .............................................. B32B 27/36
[52] U.S. Cl. ................................... 428/413; 427/118; 427/119; 427/120; 427/224; 427/243; 427/386; 427/388.1; 427/410; 428/457; 428/469; 428/689; 428/704
[58] Field of Search ............... 427/226, 228, 386, 119, 427/120, 118, 224, 243, 388.1, 410; 428/457, 469, 689, 704

[56] References Cited

U.S. PATENT DOCUMENTS

| | | | |
|---|---|---|---|
| 3,755,223 | 8/1973 | Engel | 260/18 PN |
| 4,529,467 | 7/1985 | Ward et al. | 427/386 |

FOREIGN PATENT DOCUMENTS

| | | |
|---|---|---|
| 1280543 | 7/1972 | United Kingdom . |
| 1575708 | 9/1980 | United Kingdom . |
| 2071111 | 9/1981 | United Kingdom . |
| 2121056 | 12/1983 | United Kingdom . |

Primary Examiner—Bernard Pianalto
Attorney, Agent, or Firm—Linda Pingitore

[57] ABSTRACT

A method for protecting heat sensitive substrates from fire and excessive heat involves:

I. applying to the substrate a layer of a char forming intumescent curable composition comprising:
  (a) an epoxide group containing material, at least 20 weight percent of said material having an oxirane functionality greater than 2;
  (b) a curing agent adapted to cure the epoxide group containing material wherein at least 20 weight percent of said curing agent is comprised of an aralkyl polyamine containing material;
  (c) an additive component comprising a mixture of materials adapted to provide a source of:
    (i) phosphorous,
    (ii) zinc,
    (iii) boron and
    (iv) an expansion gas upon thermal decomposition, said curable composition being capable of forming a carbonaceous char upon exposure to heat or flame;
II. allowing the intumescent curable composition to at least partially cure.

26 Claims, No Drawings

METHOD FOR PROTECTING HEAT SENSITIVE SUBSTRATES FROM FIRE AND EXCESSIVE HEAT AND RESULTING ARTICLE

BACKGROUND OF THE INVENTION

The present invention relates to methods for protecting substrates from fire and excessive heat.

The protection of heat sensitive substrates from fire and excessive heat has been an ongoing challenge. The technology which is utilized in preparing compositions for the protection of steel and concrete structural building materials such as columns, beams, girders, and other steel assemblies has been deficient in some measure for the protection of heat sensitive substrates.

Heat sensitive substrates such as plastic coated electrical cables typically have been protected by rubber based wraps or ceramic blankets. A variety of difficulties are associated with these methods. For example, in some instances the "wrap" or "blanket" is an exceptional insulator; so much so that it retains the heat generated by the electrical resistance of the cables and creates an inordinate heat build-up during normal useage. Moreover, the actual application of the "wrap" or "blanket" often is difficult because the physical location of the cables hampers access to the cables and the ability to thoroughly protect them.

Intumescent coating compositions which recently have grown in popularity and have been formulated in a variety of ways to increase the quality of protection for ferrous type substrates quite often do not meet the requirements for the protection of heat sensitive substrates. Compositions for the protection of such substrates must not only be capable of facing the ordinary service life conditions of expansion, contraction and flexing of the substrate due to, for example heating and cooling cycles and exterior climatic conditions such as winds; but also, they must meet additional requirements such as low flame spread and low smoke generation. This is typically because heat sensitive substrates are flammable thus propogate a fire rapidly and generate a great deal of smoke. In addition, depending upon the ultimate end use of the substrate, protective compositions for heat sensitive substrates often must meet stringent test criteria such as the ability to protect the substrate for a specified time period from the rapid rise in temperature experienced during a hydrocarbon fire (i.e., reaching a temperature of 2000° F. (1093° C.) in less than five minutes). Heat sensitive substrates are damaged at a much lower temperature than steel and require a different level of protection.

Heretofore, currently available intumescent compositions have fallen short of the specific requirements for the protection of heat sensitive substrates. Therefore, there is a need for a way in which to protect heat sensitive substrates from fire and excessive heat.

SUMMARY OF THE INVENTION

In accordance with the present invention there is provided a method for protecting heat sensitive substrates from fire and excessive heat comprising:

I. applying to the substrate a layer of a char forming intumescent curable composition comprising:
   (a) an epoxide group containing material, at least 20 weight percent of said material having an oxirane functionality greater than 2;
   (b) a curing agent adapted to cure the epoxide group containing material wherein at least 20 weight percent of said curing agent is comprised of an aralkyl polyamine containing material;
   (c) an additive component comprising a mixture of materials adapted to provide a source of:
      (i) phosphorous,
      (ii) zinc,
      (iii) boron and
      (iv) an expansion gas upon thermal decomposition;
      said curable composition being capable of forming a carbonaceous char upon exposure to heat or flame;

II. allowing the intumescent curable composition to at least partially cure.

DETAILED DESCRIPTION OF THE INVENTION

The claimed method for protecting heat sensitive substrates from fire and excessive heat utilizes a char forming intumescent curable composition which comprises as its principal components an epoxide group containing material, at least 20 percent of said material having an oxirane functionality greater than 2; a curing agent adapted to cure the epoxide group containing material; and an additive component. The intumescent curable composition is capable of forming a carbonaceous char upon exposure to heat or flame.

A variety of epoxide group containing materials are suitable for use herein so long as at least 20 weight percent of said material has an oxirane functionality greater than 2.

Examples of epoxide group containing materials having an oxirane functionality greater than 2 are the polyglycidyl ethers of trihydric alcohols such as 1,2,6-hexanetriol; glycerol, sorbital, trimethylolethane and trimethylolpropane. For example the triglycidyl ether of glycerol is commercially available from Marubeni America Corporations as EPIOLGE-100 and the triglycidyl ether of trimethylolpropane is commercially available from Celanese as EPI-REZ 5044. Preferably the triglycidyl ether of trimethylolpropane is utilized.

In addition to the polyglycidyl ethers of trihydric alcohols set forth above, a variety of other epoxide group containing materials having an oxirane functionality greater than 2 are suitable for use herein. For example, epoxy novolac resins such as the reaction product of epichlorohydrin with a phenolformaldehyde condensate which are described below; addition polymers containing glycidyl (meth)acrylate moieties; epoxidized oils such as soya or linseed oil; the polyglycidyl ether of polypropylene glycol such as the material commercially available from Nagase Chemicals Ltd. as DENACOL EX 611; the triglycidyl ether of an isocyanurate such as the material triglycidyl tris(hydroxyethyl)isocyanurate which is commercially available from Nagase Chemicals Ltd. as DENACOL EX 301; and the reaction prouct prepared from five moles of an epoxy resin and one mole of a polyoxyalkylene amine such as those which are commercially available from TEXACO Chemicals under the trademark JEFFAMINE.

Other epoxide group containing materials can be utilized in admixture with the aforesaid epoxide containing materials. The type of resin can vary widely and can be categorized as being aliphatic, aromatic, cyclic, acyclic, alicyclic or heterocyclic. Preferably aromatic epoxide resins are utilized. Generally, the epoxide equivalent weight ranges from about 140 to about 1780, preferably from 160 to 300. The epoxide group containing materials frequently contain hydroxyl substituents as well as halogen and ether groups.

One particularly preferred group of aromatic epoxy resins are the polyglycidyl ethers of polyhydric aromatic alcohols, such as, for example, dihydric phenols. Suitable examples include resorcinol, catechol, hydroquinone, bis(4-hydroxyphenyl)-1,1-isobutane; 4,4-dihydroxybenzophenone; bis(4-hydroxyphenyl)-1,1-ethane; bis(2-hydroxynaphenyl)methane; 1,5-hydroxynaphthalene and 4,4'-isopropylidenediphenol, i.e., bisphenol A. Preferably bisphenol A is utilized. Of the many epoxy compounds possible, the one principally utilized is epichlorohydrin although epibromohydrin is also quite useful. The polyglycidyl ethers especially useful herein are obtained by reacting epichlorohydrin and bisphenol A in the presence of an alkali such as sodium or potassium hydroxide. The series of epoxy resins sold by Shell Chemical Company under the trademark EPON are especially useful herein.

Also useful are the epoxide resins which are polyglycidyl ethers of polycarboxylic acids. These materials are produced by the reaction of an epoxy compound such as epichlorohydrin with an aliphatic or aromatic polycarboxylic acid such as oxalic acid, succinic acid, glutaric acid, terephthalic acid, 2,6-napthalene dicarboxylic acid and dimerized linoleic acid.

Still another group of epoxide resins are derived from the epoxidation of an olefinically unsaturated alicyclic material. Among these are the epoxy alicyclic ethers and esters well known in the art.

Besides the materials discussed above, useful epoxy resins also include those containing oxyalkylene groups, i.e.,

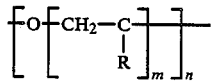

wherein R is hydrogen or $C_1$ to $C_6$ alkyl, m is an integer from 1 to 4 and n is an integer from 2 to 50. Such groups can be pendant from the backbone of the epoxide resin or they can be included as part of the backbone. The proportion of oxyalkylene groups in the epoxy resin depends upon a number of factors, among them, the size of the oxyalkylene group and the nature of th epoxy resin.

One additional class of epoxy resins encompasses the epoxy novalac resins. These resins are prepared by reacting an epichlorohydrin with the condensation product of an aldehyde with a monohydric or polyhydric phenol. One example is the reaction product of epichlorohydrin with a phenolformaldehyde condensate which has been mentioned above as a material having oxirane functionality greater than 2.

A curing agent is required in order to convert the aforedescribed epoxide group containing materials into thermoset materials. In the curing process both the epoxy groups and hydroxyl groups (if present) can participate and curing can take place either at ambient temperature or with the application of heat.

The curing agent for the compositions of the claimed invention can be selected from a variety of conventionally known materials, for example, amine type, including aliphatic and aromatic amines, and poly(amineamides). Examples of these include diethylene triamine; 3,3-amino bis propylamine; triethylene tetraamine; tetraethylene pentamine; m-xylylenediamine; and the reaction product of an amine and an aliphatic fatty acid such as the series of materials sold by Henkel under the trademark VERSAMID.

Also suitable as curing agents are polycarboxylic acids and polycarboxylic acid anhydrides. Examples of polycarboxylic acids include di-, tri-, and higher carboxylic acids such as, for example, oxalic acid, phthalic acid, terephthalic acid, succinic acid, alkyl and alkenyl-substituted succinic acids, tartaric acid, and polymerized fatty acids. Examples of suitable polycarboxylic acid anhydrides include, among others, pyromellitic anhydride, trimellitic anhydride, phthalic anhydride, succinic anhydride, and maleic anhydride.

In addition, aldehyde condensation products such as urea-, melamine-, or phenol-formaldehyde are very useful curing agents. A variety of these materials are commercially available under several trademark designations, for example, BEETLE and CYMEL from American Cyanamid and RESIMENE from Monsanto Industrial Chemicals Company.

Other suitable curing agents include boron trihalide and complexes of boron trihalide with amines, ethers, phenols and the like; polymercaptans; polyphenols; metal salts such as aluminum chloride, zinc chloride and magnesium perchlorate; inorganic acids and partial esters such as phosphoric acid and n-butyl orthophosphate. It should be understood that blocked or latent curing agents can also be utilized if desired; for example, ketamines which are prepared from a polyamine and a ketone.

In one preferred embodiment of the present invention the curing agent is a liquid, more preferably a liquid amine curing agent. Preferably at least 20 weight percent of said curing agent is comprised of an aralkyl polyamine containing material, preferably an aralkyl diamine such as, for example, 1,4-xylylene diamine or an isomeric mixture of 1,2- and 1,3-xylylene diamine. The aralkyl polyamine curing agent preferably additionally comprises an alkyl substituted phenol such as, for example, nonyl phenol. It is believed that this alkyl substituted phenol functions as a plasticizer and assists in char expansion of the intumescent curable composition when it burns. The amine curing agent which is commercially available from Henkel under the code designation VERSAMINE F-30 is a particularly preferred curing agent. Other preferred agents include a variety of aminoalkyl aromatics such as 1,2 and 1,3 xylylene diamine, 1,3,5-triaminomethylbenzene and 2,4,6-triaminomethylphenol.

The amount of epoxide group containing material and curing agent utilized in preparing the intumescent curable composition can vary, but generally the equivalent ratio of epoxy to amine is within the range of from about 0.01:1 to about 10:1; preferably from about 0.1:1 to about 5:1, and more preferably from about 0.3:1 to 3:1.

The additive component of the intumescent composition of the present invention comprises a mixture of materials adapted to provide a source of phosphorous, zinc, boron, and expansion gas upon thermal decomposition. If desired, the additive component can additionally contain a reinforcing filler.

The source of phosphorous can be selected from a variety of materials such as, for example, phosphoric acid, mono- and di-ammonium phosphate, tris(2-chloroethyl)phosphate, phosphorous-containing amides such as phosphorylamide, and melamine pyrophosphate.

Preferably the source of phosphorous acid is an ammonium polyphosphate represented by the formula:

$$(NH_4)_{n+2}P_nO_{3n+1}$$

wherein n is an integer of at least 2, preferably n is an integer of at least 50. Examples of such materials are those commercially available under the trademark designations PHOS-CHECK-P-30 from Monsanto Corporation, EXOLIT 422 from American Hoechst and AMGAD IU from Albright and Wilson Corporation. The claimed intumescent composition typically contains an amount of phosphorous which ranges from about 0.05 to about 20 percent by weight, preferably 0.5 to 10 percent by weight, the percentages being based upon the total weight of the epoxy resin, curing agent, and the additive component. The phosphorous is believed to function as a char promoter in the intumescent composition.

The expansion gas serves to cause the fire protective composition to foam and swell, i.e., intumesce, when exposed to high temperatures or flames. As a result of this expansion the char which is formed is a thick, multi-celled material which serves to insulate and protect the underlying substrate. Preferably, the source of expansion gas is a nitrogen-containing material. Examples of suitable nitrogen-containing materials include melamine, methylolated melamine, hexamethoxymethyl melamine, urea, dimethylurea, melamine pyrophosphate, dicyandiamide, guanylurea phosphate and glycine. Preferably, melamine is utilized. Other conventional sources of expansion gas can also be used such as those materials which liberate carbon dioxide. The source of expansion gas is usually present in the compositions of the present invention in an amount ranging from 0.1 to 25 percent by weight, preferably 1 to 10 percent by weight, the percentages being based upon the total weight of the epoxy resin, curing agent, and the additive component.

The source of zinc can be selected from a variety of materials. It is believed that the zinc material contributes to the formation of a small-celled structure in the char. The small cells of the char afford better insulation for the substrate and are better able to retain the char's integrity. Examples of suitable materials which are sources of zinc include zinc oxide, zinc salts such as zinc borate and zinc phosphate; zinc carbonate; also zinc metal can be used. Preferably zinc oxide, zinc borate or zinc phosphate are utilized. Usually the claimed intumescent composition contains an amount of zinc which ranges from about 0.1 to about 25 percent by weight, preferably 0.5 to 12 percent weight, the percentages being based upon the total weight of the epoxy resin, curing agent and the additive component.

The source of boron is preferably boric acid although a large variety of other materials can be utilized. It is believed that the boric acid contributes to the formation of a uniform char by acting as a fluxing aid which assists in the formation of a homogenous melt of materials during exposure to high temperatures or flames. Examples of suitable materials which can provide boron include boron oxide, borates such as sodium borate, potassium borate and ammonium borate, also borate esters such as butyl borates or pehnyl borates. After boric acid, ammonium or sodium borate are next preferred. The claimed intumescent composition usually contains an amount of boron with ranges from about 0.1 to 10 percent by weight, preferably 1 to 6 percent by weight, the percentages being based upon the total weight of the epoxy resin, curing agent and the additive component.

It should be understood that the phosphorous, zinc, boron, and expansion gas can each be provided by a separate source material or alternatively a single material may be a source of more than one of the aforelisted elements. For example, melamine pyrophosphate can provide a source of both phosphorous and expansion gas.

If utilized, the reinforcing filler can be chosen from among a large array of conventionally utilized materials including fibrous reinforcements and platelet reinforcements which are preferred over other fillers. Examples of fibrous reinforcements include glass fibers, ceramic fibers, e.g., aluminum oxide/silicon oxide, and graphite fibers. Platelet reinforcements include hammer-mill glass flakes, mica, and wollastonite. Other suitable fillers include clay, talc, silica, and various pigments. The reinforcing filler is believed to assist in controlling expansion of the fire protective composition prior to and during char formation so that the resultant char is hard and uniform. When present, the reinforcing filler is usually present in the composition in an amount ranging from about 1 to about 50 percent by weight the percentges being based upon the total weight of the epoxy resin, curing agent and the additive component.

The fire protective intumescent composition of the present invention is preferably a two-package system with the epoxy resin in one package, the curing agent in a second package and the additive component in either the epoxy resin package or the curing agent package or in both packages. Then the additive component is present in both packages the individual constituents can be in either package, as desired. The individual packages are mixed prior to use such that the epoxy to amine equivalent ratio in the resultant composition is within the broad range set forth above. The intumescent composition of the present invention can also be prepared as a single-package system. In this situation a blocked or latent curing agent would be preferred such as, for example, the ketamine curing agents which have been mentioned above. The ketamine blocked curing agents cure as a result of exposure to moisture which causes hydrolysis of the ketamine and release of the free amine curing agent. Other latent curing agents can also be utilized such as those in which the free amine curing agent is liberated as a result of exposure to radiation.

The composition of the present invention can also contain a variety of conventional additive such as stabilizers, rheology control agents, flame spread control agents, nd the like. These ingredients are, of course, optional and can be added in varying amounts.

The fire protective intumescent composition of the present invention when it is prepared is usually in the form of a thick, paste-like material generally termed a mastic. The mastic can be applied by a variety of methods such as with a spray applicator or with a trowel. Preferably the claimed intumescent compositions are spray applied. Although not necessary, if desired the compositions can be thinned or warmed prior to application. Thinning can be accomplished with a variety of conventional solvents such as methylene chloride or 1,1,1-trichloroethane. Although many conventional solvents are suitable, preferably the solvent is non-flammable and of high volatility. As an alternative to the use of thinning solvents, the individual components of the composition can be reheated and then mixed in line during spraying.

The method of the claimed invention is particularly suitable for the protection of heat sensitive substrates such as plastics, fiberglass reinforced resins and metals which have a relatively low melting point such as aluminum or aluminum alloys. By "relatively low melting point" is meant a melting point below 1100° C., especially below 950° C. and more particularly below 700° C.

The term "heat senstive substrates" is intended to encompass those substrates which are more sensitive to heat than ferrous type substrates such as steel. As a result they are damaged at temperatures which are relatively lower than those at which steel is damaged. The actual temperature at which the substrate is damaged can vary widely and depends upon the particular composition of the substrate at hand.

The aforedescribed coating compositions are particularly suitable for coating cables which are jacketed in a heat sensitive skin, such as polyvinyl chloride. Examples of such cables include PVC coated electrical cables, optical cables, superconducting cables, their bundles, and the like. The intumescent compositions which are utilized in the claimed method exhibit low smoke generation during burning, good vibration resistance, good flexibility and reduced flame spread. In addition, the compositions are not such good heat insulators in the unburned state that they create undue heat buildup in electrical cables during normal useage.

The invention is further described in connection with the examples which follow. These Examples are given as illustrative of the invention and are not to be construed as limiting the invention to their details.

EXAMPLE 1

This Example illustrates the method of the claimed invention.

Part A

This part of the Example shows the prepartion of the curable intumescent composition which is applied in Part B.

|  | Ingredients | Percent by Weight |
|---|---|---|
| Package 1: | EPI-REZ 5044[1] | 22.8 |
|  | FYROL CEF[2] | 9.8 |
|  | EXOLIT 422[3] | 6.8 |
|  | boric acid | 19.6 |
|  | antimony oxide | 3.8 |
|  | melamine | 5.0 |
| Package 2: | VERSAMINE F-30[4] | 15.2 |
|  | pentaerythritol | 10.6 |
|  | zinc borate | 3.0 |
|  | ATTAGEL-50[5] | 3.0 |

[1]This aliphatic epoxide group containing material is the triglycidyl ether of trimethylolpropane and it is commercially available from Celanese.
[2]This is tris-(2-chloroethyl) phosphate which is commercially available from Stauffer Chemicals.
[3]Ammonium polyphosphate which is commercially available from American Hoechst.
[4]This amine curing agent has an average amine equivalent weight of 167 and is commercially available from Henkel.
[5]This attapulgite clay, used herein as a rheology control agent, is commercially available from Englehard minerals.

The intumescent curable composition was prepared by combining 2.3 parts by weight of Package 1 with 1 part by weight of Package 2.

Part B

The intumencent curable composition prepared in Part A was spray applied using an airless spray gun onto two Anaconda Continental TTRS-6 Standard PVC jacketed electrical cables. The composition was allowed to cure overnight at ambient temperature.

The coated electrical cables were then tested according to ASTM E-162 (Surface Flammability of Materials Using a Radiant Heat Energy Source). The wires had a Flame Spread Index of 22 and 25, respectively. A Flame Spread Index of 25 or less is considered excellent.

What is claimed is:

1. A method for protecting heat sensitive substrates from fire and excessive heat comprising:
   I. applying to the substrate a layer of a char forming intumescent curable composition comprising:
   (a) an epoxide group containing material, at least 20 weight percent of said material having an oxirane funtionality greater than 2;
   (b) a curing agent adapted to cure the epoxide group containing material wherein at least 20 weight percent of said curing agent is comprised of an aralkyl polyamine containing material;
   (c) an additive component comprising a mixture of materials adapted to proved a source of:
      (i) phosphorous,
      (ii) zinc,
      (iii) boron and
      (iv) an expansion gas upon thermal decomposition, said curable composition being capable of forming a carbonaceous char upon exposure to heat or flame;
   II. allowing the intumescent curable composition to at least partially cure.

2. The method of claim 1 wherein the aralkyl polyamine is an aralkyl diamine.

3. The method of claim 2 wherein the curing agent comprises 1,4-xylylene diamine.

4. The method of claim 1 wherein the curing agent is a liquid.

5. the method of claim 1 wherein the composition is a one package system wherein the curing agent is a latent curing agent.

6. The method of claim 1 wherein the intumescent curable composition additionally comprises a reinforcing filler.

7. The method of claim 6 wherein the reinforcing filler is in fibrous or platelet form.

8. The method of claim 7 wherein the reinforcing filler is Wollastonite.

9. The method of claim 1 wherein the composition is a two package system with the epoxy resin in one package, the curing agent in a second package and the additive component in either the epoxy resin package or the curing agent package, or in both packages.

10. The method of claim 1 wherein the curable composition is applied such that the substrate is essentially encapsulated in the applied coating.

11. The method of claim 1 wherein the heat sensitive substrate is a polymeric material.

12. The method of claim 11 wherein the substrate is a plastic.

13. The method of claim 12 wherein the substrate is a plastic coated electrical cable or group of cables.

14. A coated article according to claim 12.

15. The method of claim 1 wherein the heat sensitive substrate is a metal having a relatively low melting point.

16. The method of claim 15 wherein the substrate is aluminum or an aluminum alloy.

17. A coated article according to claim 16.

18. A coated article according to claim 1.

19. The method of claim 1 wherein the epoxide group containing material is the triglycidyl ether of trimethylolpropane.

20. The method of claim 1 wherein the material adapted to provide a source of phosphorous is an ammonium polyphosphate represented by the formula $(NH_4)_{n+2}P_nO_{3n+1}$ wherein n is an integer of at least 2.

21. The method of claim 20 wherein n is an integer of at least 50.

22. The method of claim 20 wherein the material adapted to provide a source of phosphorous is a phosphorous-containing amide.

23. The method of claim 1 wherein the material adapted to provide a source of expansion gas is a nitrogen-containing material.

24. The method of claim 23 wherein the expansion gas-providing material is melamine.

25. The method of claim 1 wherein the material adapted to provide a source of zinc is selected from the group consisting of zinc oxide, zinc borate, and zinc phosphate.

26. The method of claim 1 wherein the material adapted to provide a source of boron is selected from the group consisting of boric acid, ammonium borate and sodium borate.

* * * * *

UNITED STATES PATENT AND TRADEMARK OFFICE
CERTIFICATE OF CORRECTION

PATENT NO.   :   4,808,476

DATED        :   February 28, 1989

INVENTOR(S)  :   John P. Mikus, Robert W. Heber, Thomas A. Ward
                 and Jerome A. Seiner It is certified that error appears in the above-identified patent and that said Letters Patent is hereby corrected as shown below:

In the Claims, column 8, line 22, "proved" should read --provide--.

Signed and Sealed this

Twenty-first Day of September, 1993

Attest:

BRUCE LEHMAN

*Attesting Officer*   *Commissioner of Patents and Trademarks*